United States Patent [19]

Jacobson

[11] Patent Number: 4,613,476
[45] Date of Patent: Sep. 23, 1986

[54] RADIATION ATTENUATING FLUID WORK ENVIRONMENT

[76] Inventor: Earl B. Jacobson, 510 S. Shore Dr., Crystal Lake, Ill. 60014

[21] Appl. No.: 376,611

[22] Filed: May 10, 1982

[51] Int. Cl.[4] .............................................. G21C 17/00
[52] U.S. Cl. .................................. 376/249; 376/287; 250/517.1
[58] Field of Search ............... 376/203, 249, 245, 250, 376/287, 205, 262, 263; 250/515.1, 517.1

[56] References Cited

U.S. PATENT DOCUMENTS

| | | | |
|---|---|---|---|
| 3,143,479 | 8/1964 | Hargo et al. | 376/262 |
| 3,633,784 | 1/1972 | Taft | 376/205 |
| 3,756,915 | 9/1973 | Matveevich et al. | 376/249 |
| 3,812,008 | 5/1974 | Fryer | 376/205 |
| 3,883,012 | 5/1975 | Jones | 376/203 |
| 3,943,037 | 3/1976 | Siegert et al. | 376/263 |
| 4,071,404 | 1/1978 | Aoki | 376/287 |
| 4,170,517 | 10/1979 | Meuschke et al. | 376/205 |
| 4,298,054 | 11/1981 | Adamowski | 376/245 |
| 4,375,104 | 2/1983 | Starr et al. | 376/203 |

Primary Examiner—Salvatore Cangialosi
Attorney, Agent, or Firm—Silverman, Cass, Singer & Winburn, Ltd.

[57] ABSTRACT

An inspection and repair system for a substantially enclosed radioactive work environment to protect and shield workers therein from radiation. The system decreases health hazards for workers and increases the safety margin within the environment. The method contemplates utilizing a tank coupled to the environment for entrance thereto. The environment and the tank are filled with a radiation attenuating fluid which protects workers entering the environment through the tank. The workers are supplied with air from an external source for respiratory protection and relieving the worker of cumbersome self contained breathing apparatus. The system can also utilize pumps for circulating the water therein and a filter for filtering out contaminants.

25 Claims, 5 Drawing Figures

RADIATION ATTENUATING FLUID WORK ENVIRONMENT

BACKGROUND OF THE INVENTION

The invention relates generally to contaminant control systems and more particularly to a method and system which enables workers to work in an enclosed radioactive workspace safely for longer periods with greater freedom of movement in the workspace.

In nuclear power plants, steam generators typically are utilized as heat exchangers between the reactor and a power generating steam turbine. The steam generators have hundreds or thousands of heat exchange tubes in single pass or double pass loop tubes inside the generator housing. The tubes carry contaminated water, at high temperature and pressure from the reactor, through the generators, which in turn transfers heat to water around the tubes, creating steam to drive the turbine. Periodically, typically during a reactor refueling outage, or if a leak occurs, the tubes are checked to make sure they are not leaking or stressing to the point where they will leak contaminated water into the steam.

The tubes are checked by running a tester, typically an eddy current tester, over the length of each tube to be checked. Typically, unless a leak has occurred, some predetermined number of the thousands of tubes are checked during each outage so that during a period of time all the tubes are checked. The testers are operated and repairs or sealing off of leaking tubes are sometimes performed by workers physically climbing into the steam generators through a manway or portal in the generator housing. The interior of the generators, which typically are sixty feet high, present workers with the problems of a high radiation environment and contact contamination with radioactive airborne particles which are on the interior surfaces of the housing and are dislodged by the workers themselves from the tubes and surfaces.

Due to the fact that the interior or workspace of the generator is a high radiation environment, the workers are only permitted to be inside the generator for a few minutes at a time. The checking and repairs, therefore may require hundreds of entrances and exits. Many attempts to shield the radiation of the interior walls and tubes of the generator have been attempted with limited success. These decontamination approaches are very expensive and create radioactive wastes.

Further, the problem of contact contamination within the workspace requires respiratory protection for the workers, as well as causing surface contamination of the workers garments, which contamination is then brought out of the generator when the workers climb out of the portal. Each worker typically is attired in several layers of clothing covered by a plastic outer layer and a self contained breathing apparatus or supplied-air respirator. This makes it difficult to pass through the portals, which usually are small on the order of sixteen inches in diameter, and the clothing itself is cumbersome to work in.

Further, each time the worker leaves the generator at least the outer clothing which has radioactive contaminants on it has to be removed and disposed of. The area around the portal becomes contaminated and must be cleaned. The workers outside the generator are exposed to the contaminants brought out on the clothing and the worker himself is further exposed because the contaminants are in physical contact with the clothing and remain there while the clothing is further handled and disposed of.

The invention permits workers to work in a cool, comfortable radiation attenuated environment without cumbersome extra clothing. The workers pass into and out of the enclosed workspace of the steam generator through the system of the invention without physical exposure to the contaminants and without carrying contaminants outside the workspace. The radiation emitted by the surfaces and tubes of the generator, particularly the lower end portion of the tubes, is absorbed by a radiation attenuating fluid of the system. Thus, the length of exposure to the workers is reduced, the amount of material to be disposed of is greatly reduced and contamination of workers and outside areas are sustantially eliminated. Further, the contaminants are not handled because the contaminants are filtered by the present invention and removed from the enclosed workspace.

SUMMARY OF THE INVENTION

The above and other disadvantages of prior art contaminant control techniques and systems are overcome in accordance with the present invention by providing a method and system for an enclosed radioactive work environment. The method and system insulates the workers from physical contact with the contaminants, as well as shielding the workers from radiation, thereby increasing the length of time the worker can remain in the work environment. The method provides for a fluid receiving tank having a channel sealingly coupled to an entrance of a radioactive workspace such as the lower portion of nuclear power plant steam generator, or the like. The channel provides fluid communication between the tank and the workspace as well as a passageway for workers to enter and exit the workspace through the tank. The tank and the workspace, through the tank, is filled with a good radiation attentuating fluid, such as, water or the like. The fluid shields the worker from the radiation of the workspace, increasing the length of time the worker can remain in the workspace. Further, respiratory protection for the workers is accomplished by providing a source of outside air through an air supply conduit to the worker in the workspace. This also relieves the worker from a cumbersome self contained breathing apparatus.

The method also provides for circulating the radiation attenuating fluid between the tank and the workspace, cooling the fluid for worker comfort and also for filtering out radioactive contaminants. The tank may also be lined with a disposable liner to protect the tank from radiation contamination. Further, the aforementioned method, by providing a plurality of channels leading therefrom, can accommodate a plurality of radioactive workspaces to provide a contaminant free, radioactive shielded environment for the workers therein.

The system of the present invention includes a fluid receiving work tank having an open top through which workers can enter and exit and a closed bottom. The tank also has a channel extending from an opening in the tank to provide a passageway outwardly from the tank for worker access therethrough. The distal end of the channel has a flange adapted for sealingly coupling the channel to an entrance portal of a workspace. The tank can also have a plurality of channels adapted to sealingly connect the tank to a plurality of workspaces.

The system can also include a pump for circulating fluid contained within the tank and workspace, a fluid cooler for cooling the fluid for worker comfort, as well as a filter for filtering out contaminants in the fluid. Further, the system can utilize a fluid containing liner that approximates the size and shape of the tank and corresponding channels to prohibit contamination of the tank. The liner may be disposable or reusable and is made of a fluid impervious material. The liner can also have an integrally formed conduit to hook up to a pump to provide circulation of the fluid.

DETAILED DESCRIPTION

Figure 1:
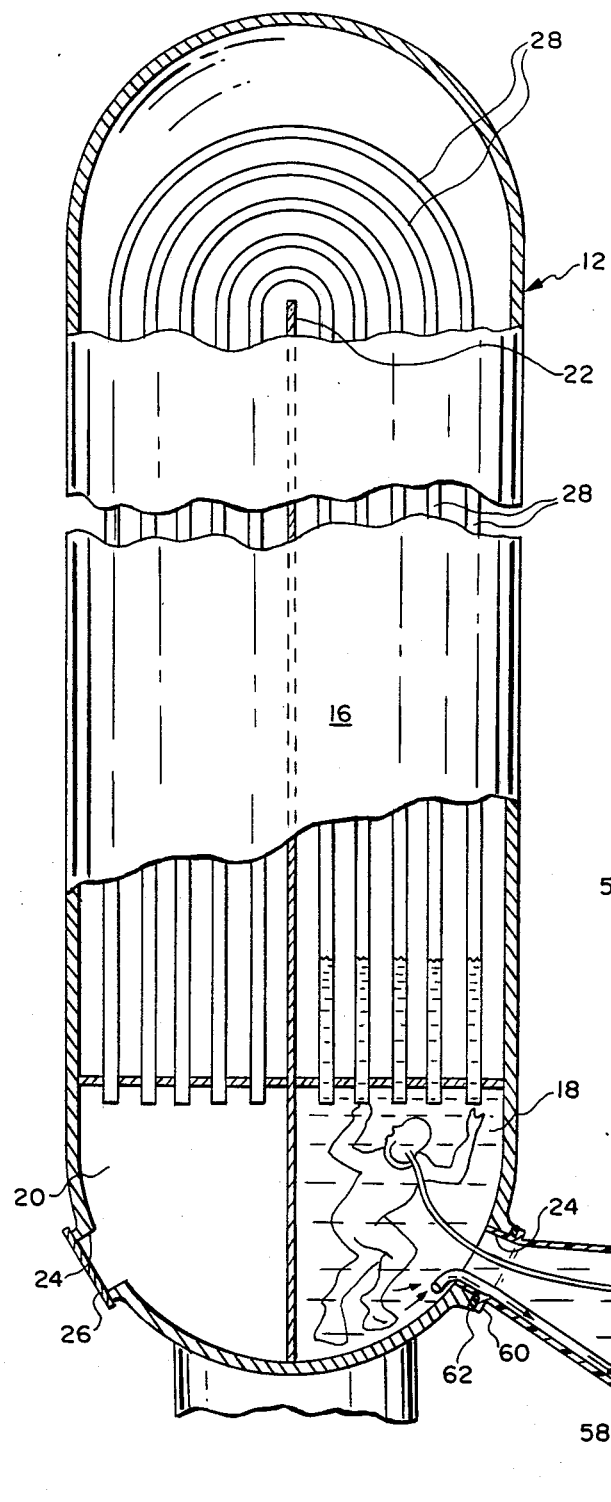
FIG. 1 is a side plan view of the present invention coupled to a steam generator having portions broken away.

Referring to FIG. 1, an inspection and repair system embodying the present invention is designated generally by the reference numeral 10. The system 10 is shown operatively in place along side a steam generator 12 of a nuclear power plant. The generator 12 includes an outer housing 16 and lower interior workspaces 18 and 20 divided by septum 22. The housing 16 includes a portal or manway 24 for each of the workspaces 18 and 20 to provide access thereto. Each portal 24 is sealed and secured by a plate 26 during periods of non-inspection of the interior of the generator 12.

The generator 12 has thousands of heat transfer water tubes 28 extending the length thereof to exchange heat between hot water from a nuclear reactor within the tubes 28 and water outside the tubes 28, to create steam to run a power generator turbine. A tube checker or eddy current tester (not shown) will travel up and down each tube 28 to check for leaks or potential leaks. If any leak is found, it is repaired or the tube is sealed to prevent its use.

Figure 2:
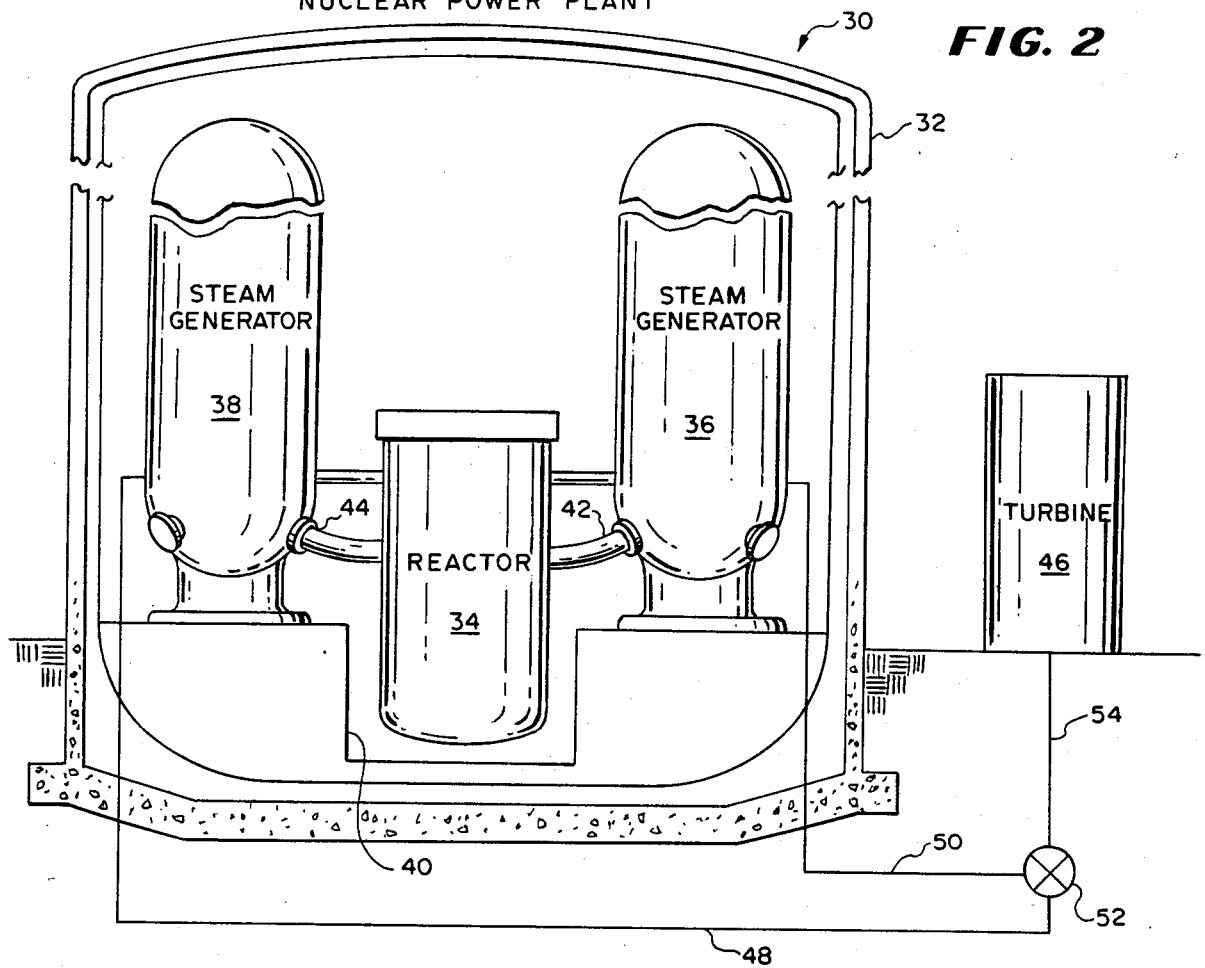
FIG. 2 is a partial block and diagrammatic view of a nuclear power plant.

Referring now to FIG. 2, a typical nuclear power plant 30 includes a main building 32 in which are housed a reactor 34 and a pair of steam generators 36 and 38. The reactor 34 and generators 36 and 38 are installed in a floor 40. The reactor 34 is coupled to each generator 36 and 38 by respective lines 42 and 44. Each of the generators 36 and 38 is coupled to a power generating turbine 46 by lines 48 and 50 coupled through a valve 52 to a line 54. Thus, during each outage, the system 10 can be utilized in the power plant. The system 10 will replace numerous items of individual clothing for the workers and increase the amount of time they can spend in the generator for work which may be taking place for two weeks of an eight week refueling outage. The lines shown with the plant 30 are merely for illustration and in reality there may be numerous other interconnecting and return lines between the various elements.

Turning once more to FIG. 1, the system 10 includes a fluid receiving tank 56, which may or may not be dedicated to the power plant site, having a passageway or channel 58 connected to the tank 56 at opening 57 and extending outwardly therefrom. The shape of passageway 58 and the tank 56 may be modified to accommodate the restrictive area around the generator. The passageway 58 has a flange 60 at its distal end adapted to be secured to a lip 62 of the portal 24 to provide a sealed connection thereto once plate 26 has been removed. The tank 56 is opened at its upper end portion to allow workers to enter and exit the tank 56 on their way to the workspace 18 through passageway 58. A platform 64 connected to the upper end portion of the tank 56 and a stairway 66 leading therefrom can be utilized to facilitate worker access to the tank. Further, the tank 56 can have a conduit or fluid line 68 therein which is adapted to be connected to a circulating pump 70 for circulating fluid between the workspace 18 and the tank 56. Also, a filter 72 can be provided for filtering out radioactive particles or other contamination present in the fluid, as well as a fluid cooler for cooling the fluid for worker comfort.

Figure 4:
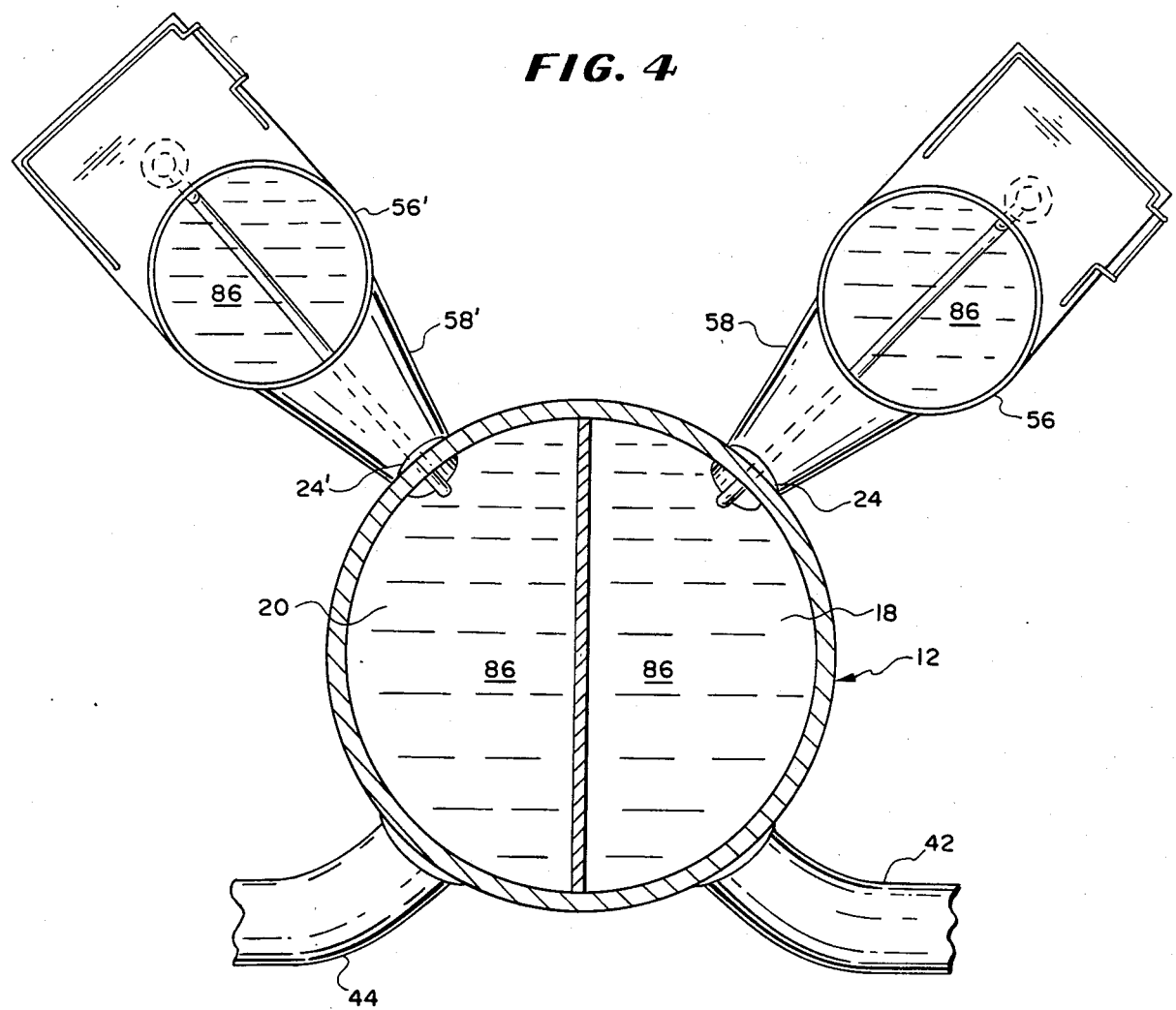
FIG. 4 is a top view of an embodiment of the present invention coupled to a steam generator (shown in section)

FIG. 4 depicts workspaces 18 and 20 being worked on concurrently and has two tanks 56 and 56' having respective passageways 58 and 58' coupled to respective portals 24 and 24' of each workspace. It is also contemplated within the scope of this invention that one tank can be sealingly connected to a plurality of workspaces. This can be accomplished by providing a plurality of passageways connected to respective portals providing communication between each workspace and the one tank.

Figure 5:
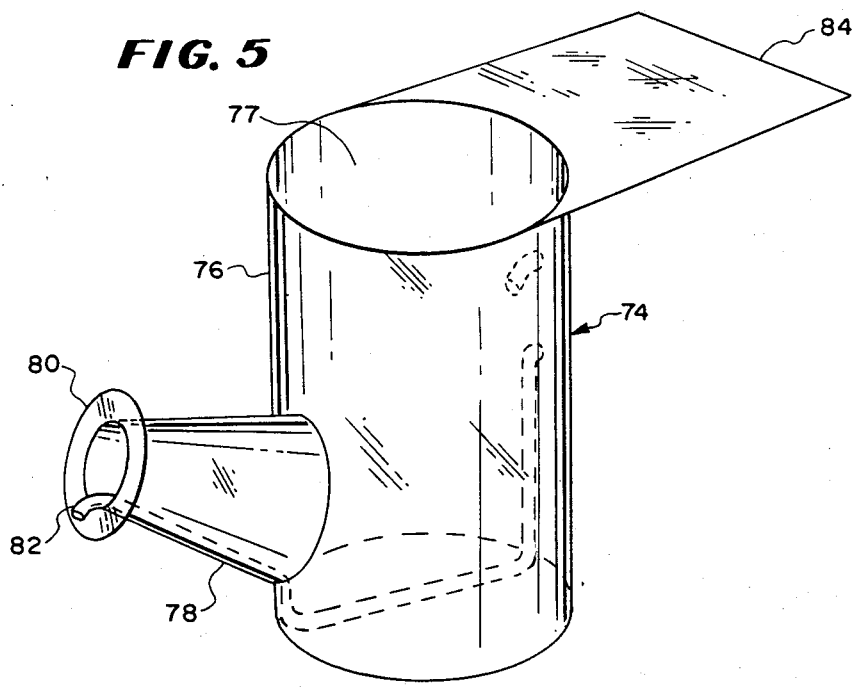
FIG. 5 is a perspective view of a portion of the present invention.

A fluid containing liner 74 which can be used with the system 10 hereinabove disclosed is shown in FIG. 5. The liner 74, which may or may not be disposable, approximates the size and shape of the tank 56 in which it is used. The liner 74 is made of a fluid impervious material to prevent fluid contact with the tank and therefore preventing contamination. The liner 74 has a main body 76, with an opening 77 at its upper end portion, integrally formed with a passageway body 78. The passageway body 78 includes a skirt 80 at its distal end portion to provide a fluid seal when utilized in the system 10 with the system 10 connected to a portal 24.

The liner 74 can also be formed with a plurality of passageway bodies 78 to accommodate a plurality of passageways to respective workspaces. A fluid line or conduit 82 can be integrally formed with the liner 74. The line 82 is adapted to be connected to a circulating pump 70 for circulating fluid 86. Also, the liner 74 can be formed with an apron 84 at its upper end portion and extending outwardly from the rim of the opening 77 to provide a protective layer for a platform.

The system 10 is utilized in accordance with the method of the present invention by having a substantially enclosed radioactive workspace such as workspace 18, for example, which includes entrance portal 24. The tank 56 of system 10 hereinabove described is then sealingly connected to the lip 62 of the portal 24 by the flange 60 of the passageway 58. There is now provided a sealed conduit between the tank 56 and workspace 18 to allow workers and fluid to pass therebetween.

The tank 56 is then filled with a radiation attenuating fluid 86 such as water, for example, which fills the workspace 18 and the lower ends of the tubes 28, therethrough. The fluid level within the workspace 18 and tubes 28, is such that it will achieve attenuation of radiation to the extremities of the worker's body, like his head or arms. With the tank 56 and workspace 18 filled with the radiation attenuating fluid 86, a worker wearing a conventional diving suit can enter the tank 56 through its upper end portion and pass through opening 57 and passageway 58 on his way to the workspace 18 to perform his function of tube inspection and repair. The worker would preferably wear a disposable suit over the diving suit to remove all contact type contamination upon his exit from the system. The worker is supplied with an external source of air through conduit 88 and air supply 90 to provide respiratory protection to the worker (FIG. 1). Also, by providing an external source of air, the worker is relieved of cumbersome self contained breathing apparatus allowing for ease of maneuverability and passage from the tank 56 to the workspace 18.

As a further part of the method, the fluid 86 can be circulated between the tank 56 and the workspace 18 through the line 68 connected to the pump 70. The circulation of the fluid 86 enhances radiation shielding of the fluid 86. The fluid 86 also can be filtered by filter 72 to remove harmful radioactive particles which can mix with the fluid 86 in the workspace 18. Further, the fluid 86 can be cooled by cooler 73 to provide a comfortable work environment for the worker.

Figure 3:
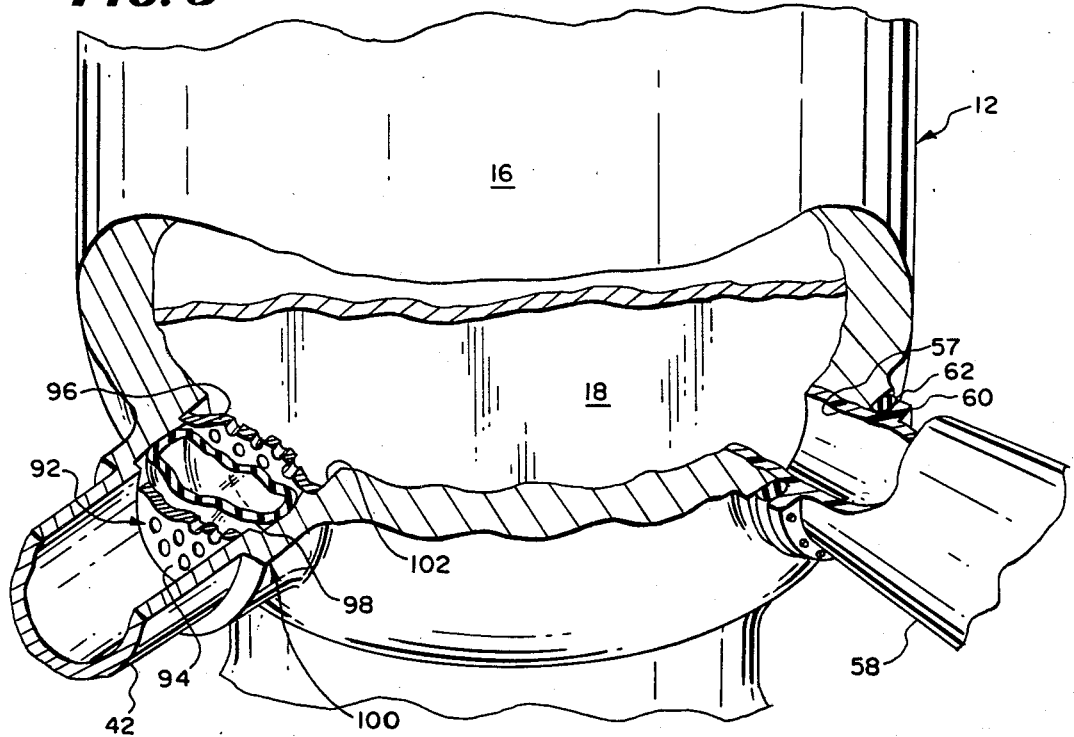
FIG. 3 is an enlarged view of the lower portion of a steam generator partially in section showing a portion of the present invention.

When the workspace 18 is the lower portion of a nuclear power plant steam generator, as best seen in FIG. 3, line 42 which leads from the nuclear reactor 34 to the generator 36 (FIG. 2) must be sealed to provide a substantially enclosed workspace and provide a barrier to prevent the radiation attenuating fluid 86 from escaping therethrough. A barrier 92 is provided in line 42 by having a worker enter the workspace 18 prior to filling it with fluid 86 and placing the barrier 92 within line 42 to substantially enclose and seal workspace 18. The barrier 92 preferably includes a pair of substantially parallel spaced plates 94 and 96 having an inflatable sealing member 98 therebetween. The barrier 92 is secure in line 42 due to line 42 having an inverted truncated cone portion 100 leading from opening 102 of the generator.

The system and method of the present invention provides greater radiation shielding and protection for workers within an enclosed radioactive work environment allowing for increased working time within the environment. This is extremely advantageous in that the allowed radiation dose per calendar quarter for each worker is reached in three to five minutes without the use of this system. The invention does away with the burdensome multiple layers of clothes previously required as well as doing away with the large and cumbersome self contained breathing apparatus, therefore allowing greater freedom of movement in an already cramped area.

Modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for inspection and repair of a radioactive environment comprising:
   providing a substantially enclosed radioactive workspace having at least one entrance portal, said workspace being a portion of said radioactive environment;
   providing a separate liquid receiving work tank having a first opening through which workers can enter and exit said tank, said work tank being separate from said radioactive environment;
   physically attaching and sealingly coupling said tank to said entrance portal through a second opening in said tank to provide a passageway for the workers between said tank and said enclosed workspace;
   filling said tank and said workspace through said passageway and said portal with a radiation attenuating liquid; and
   confining said liquid to said tank, said passageway and said workspace to provide a liquid radiation attenuating medium for the workers to pass into and out of and work in said liquid filled workspace.

2. The method as defined in claim 1 wherein:
   said enclosed workspace includes a second portal; and
   defining said substantially enclosed workspace by sealing off said second portal.

3. The method as defined in claim 1 including circulating said liquid between said tank and said workspace.

4. The method as defined in claim 1 including lining said tank with a disposable liner preventing contamination of said tank.

5. The method as defined in claim 1 including providing the worker with an external source of air.

6. The method as defined in claim 1 wherein said radiation attentuating liquid is water.

7. The method as defined in claim 1 wherein said enclosed radioactive workspace is the lower portion of a nuclear power plant steam generator.

8. The method as defined in claim 1 including filtering said liquid in said tank and said workspace.

9. The method as defined in claim 3 including filtering said liquid as it is being circulated.

10. The method as defined in claim 1 including cooling said liquid in said tank and said workspace.

11. The method as defined in claim 1 including:
    defining a second substantially enclosed radioactive workspace having at least one other entrance portal; and
    sealingly coupling said second workspace at said other portal to said tank through a third opening in said tank to provide a passageway for the workers therebetween.

12. The method as defined in claim 1 including:
    defining a second substantially enclosed radioactive workspace having at least one other entrance portal;
    providing a second liquid receiving tank having a first opening through which workers can enter and exit said tank;
    sealingly coupling said second tank to said other portal through a second opening in said second tank to provide a passageway for the workers therebetween;
    filling said second tank and said second workspace through said passageway and said portal with a radiation attenuating liquid; and
    confining said liquid to said tank, passageways and said workspaces.

13. An inspection and repair system for a radioactive environment having a substantially enclosed radioactive workspace with at least one entrance portal, said workspace being a portion of said radioactive environment comprising:
    a separate liquid receiving work tank having a first opening through which workers can enter and exit said tank, said work tank being separate from said radioactive environment;

passageway means extending from a second opening of said tank for providing worker access between said tank and said enclosed workspace;

said passageway means including means for physically attaching and sealingly coupling said tank to the entrance portal; and radiation attenuating liquid substantially confined to said tank and said workspace to provide a liquid radiation attenuating medium for the workers to pass into and out of and work in said liquid filled workspace.

14. The system as defined in claim 13 wherein:
said workspace includes a second portal; and
sealing means for sealing said second portal to define said substantially enclosed workspace.

15. The system as defined in claim 14 wherein said tank is lined with a disposable liner to prevent radioactive contamination of said tank.

16. The system as defined in claim 13 wherein the enclosed radioactive workspace is the lower portion of a nuclear power plant steam generator.

17. The system as defined in claim 13 wherein said tank is fiberglass.

18. The system as defined in claim 15 wherein platform means for access to said tank couple stair means for access to said tank at their respective upper end portions to provide easy entrance to said first opening of said tank.

19. The system as defined in claim 18 wherein said disposable liner covers said platform means and said stair means.

20. The system as defined in claim 13 wherein said tank includes pump circulating means for circulating said fluid.

21. The system as defined in claim 13 wherein:
said tank includes second passageway means extending from a third opening of said tank for providing worker access therethrough;

said second passageway means including means for sealingly coupling a second entrance portal of a second substantially enclosed workspace, said radiation attenuating liquid being substantially confined to said tank, passageways and workspaces.

22. A liquid containing liner for a radiation attenuating system for a radioactive environment having a susbtantially enclosed radioactive workspace with at least one entrance portal, said workspace being a portion of said radioactive environment comprising:

a first elongated body having an open end and a closed end and being formed of a liquid impervious material said body being separate from said radioactive environment; and a passageway connected to said first body and including means adapted to be physically attached and sealingly secured to the portal, said passageway and said first body forming an integral member for containing liquid therein to provide a liquid radiation attenuating medium for allowing a worker to pass between said tank and said enclosed workspace.

23. The apparatus as defined in claim 22 including circulation tube means integrally formed with said body and said passageway for providing circulation of said liquid when said tube means is connected to a pump.

24. The apparatus as defined in claim 22 or 23 wherein there is provided a plurality of passageways connected to said first body each having means adapted to be sealingly secured to a portal and said passageways and said first body forming an integral member for containing liquid therein and allowing a worker to pass therebetween.

25. The apparatus as defined in claim 22 wherein a second substantially flat body is integrally formed at the upper end portion of said first body and extends outwardly therefrom.

* * * * *